United States Patent
Park

(10) Patent No.: US 11,235,688 B2
(45) Date of Patent: Feb. 1, 2022

(54) DEVICE FOR FOLDING EMERGENCY EXIT SEAT FOR BUS

(71) Applicants: HYUNDAI MOTOR COMPANY, Seoul (KR); KIA MOTORS CORPORATION, Seoul (KR)

(72) Inventor: Jae Man Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/003,579

(22) Filed: Aug. 26, 2020

(65) Prior Publication Data

US 2021/0078465 A1 Mar. 18, 2021

(30) Foreign Application Priority Data

Sep. 16, 2019 (KR) .................. 10-2019-0113226

(51) Int. Cl.
| | |
|---|---|
| *B60N 2/30* | (2006.01) |
| *B60N 2/005* | (2006.01) |
| *B60N 2/68* | (2006.01) |
| *B60N 2/90* | (2018.01) |
| *B60N 2/10* | (2006.01) |
| *B60N 2/24* | (2006.01) |

(52) U.S. Cl.
CPC ............. *B60N 2/30* (2013.01); *B60N 2/005* (2013.01); *B60N 2/10* (2013.01); *B60N 2/242* (2013.01); *B60N 2/68* (2013.01); *B60N 2/919* (2018.02); *B60N 2002/967* (2018.02)

(58) Field of Classification Search
CPC .......... B60N 2/30; B60N 2/919; B60N 2/005; B60N 2/10; B60N 2/242; B60N 2/68; B60N 2/933; B60N 2002/967; B60N 2002/948
USPC .................................. 297/326, 325
See application file for complete search history.

(56) References Cited

U.S. PATENT DOCUMENTS 6,991,293 B2 * 1/2006 Lang .................. B60N 2/01583
296/65.03
8,562,060 B2 * 10/2013 Kato .................... B60N 2/3043
296/65.12

(Continued)

FOREIGN PATENT DOCUMENTS

| JP | 2001-301503 A | 10/2001 |
|---|---|---|
| JP | 2002-283896 A | 10/2002 |

(Continued)

*Primary Examiner* — Mark R Wendell
(74) *Attorney, Agent, or Firm* — Morgan, Lewis & Bockius LLP

(57) ABSTRACT

A device for folding an emergency exit seat for a bus includes: a main frame for supporting a seat; a first folding frame and a second folding frame; a first seat leg and a second seat leg; a hinge body configured in a way that the first folding frame is hinged at the first seat leg and the second folding frame is hinged at the second seat leg; a first latch assembly arranged between a rear end portion of the first folding frame and a rear end portion of the first seat leg; a second latch assembly arranged between a rear end portion of the second folding frame and a rear end portion of the second seat leg; a wire connected to the first latch assembly and the second latch assembly; and a strap connected to the first latch assembly.

15 Claims, 14 Drawing Sheets

(56) References Cited

U.S. PATENT DOCUMENTS

| | | | |
|---|---|---|---|
| 2010/0127545 A1* | 5/2010 | Jeong | B60N 2/01516 |
| | | | 297/326 |
| 2011/0127794 A1* | 6/2011 | Lindsay | B60N 2/20 |
| | | | 296/65.05 |
| 2013/0341953 A1* | 12/2013 | White | B60N 2/3079 |
| | | | 296/65.01 |
| 2016/0046209 A1* | 2/2016 | Lee | B60N 2/933 |
| | | | 297/61 |
| 2019/0225120 A1* | 7/2019 | Kish | B60N 2/045 |
| 2019/0225130 A1* | 7/2019 | Kish | B60N 2/165 |

FOREIGN PATENT DOCUMENTS

| | | |
|---|---|---|
| KR | 10-2000-0010239 A | 2/2000 |
| KR | 10-0919114 B1 | 9/2009 |

\* cited by examiner

[FIG. 1]
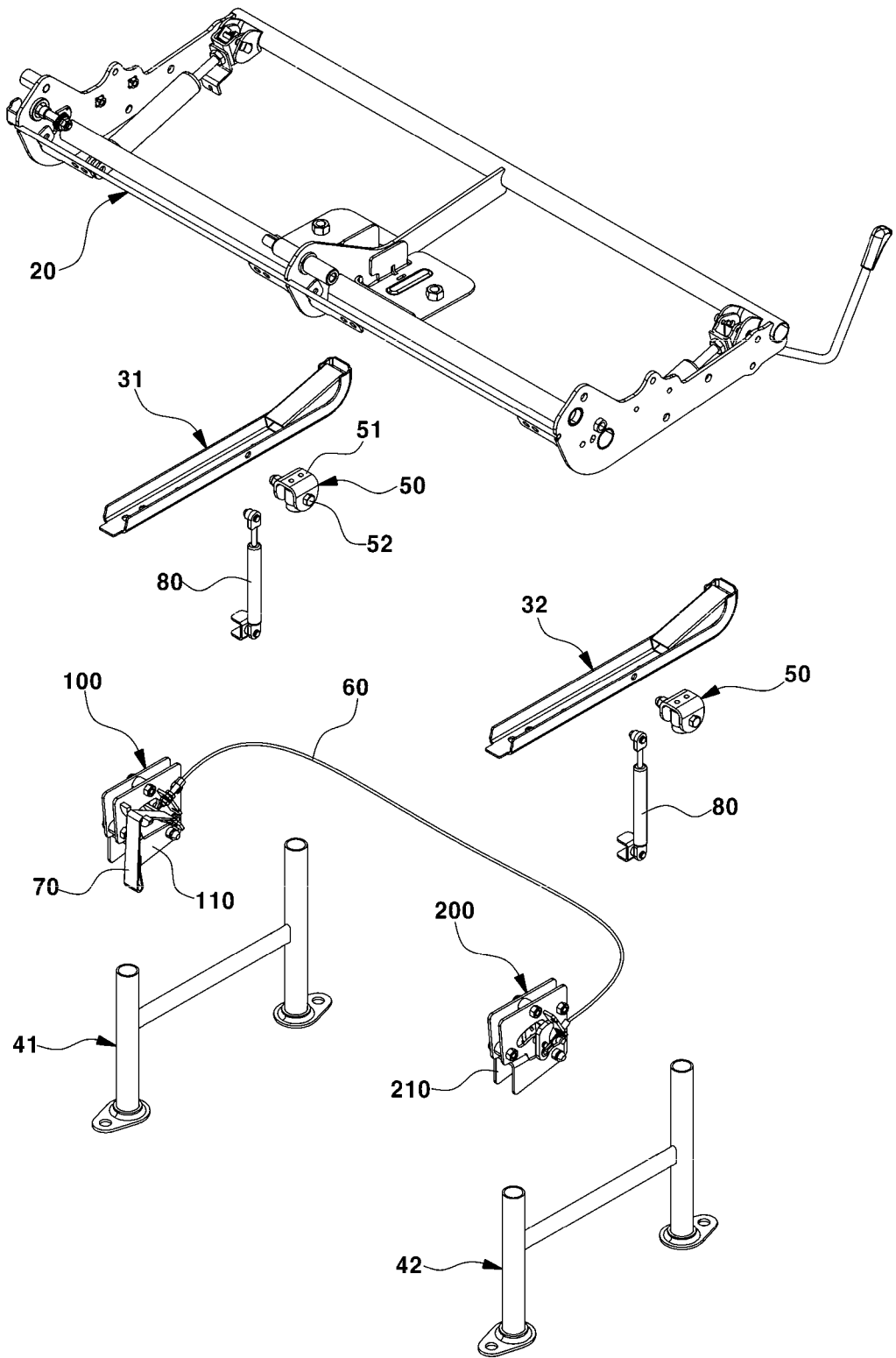

[FIG. 2]
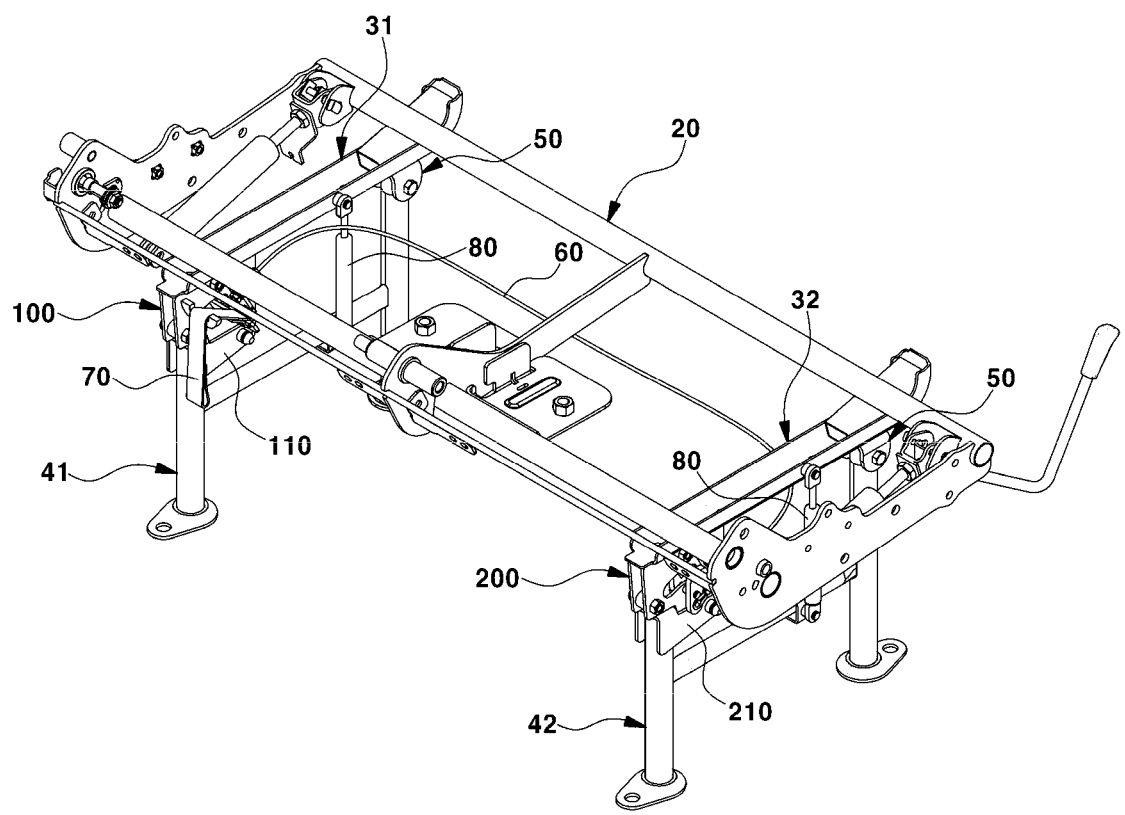

[FIG. 3]
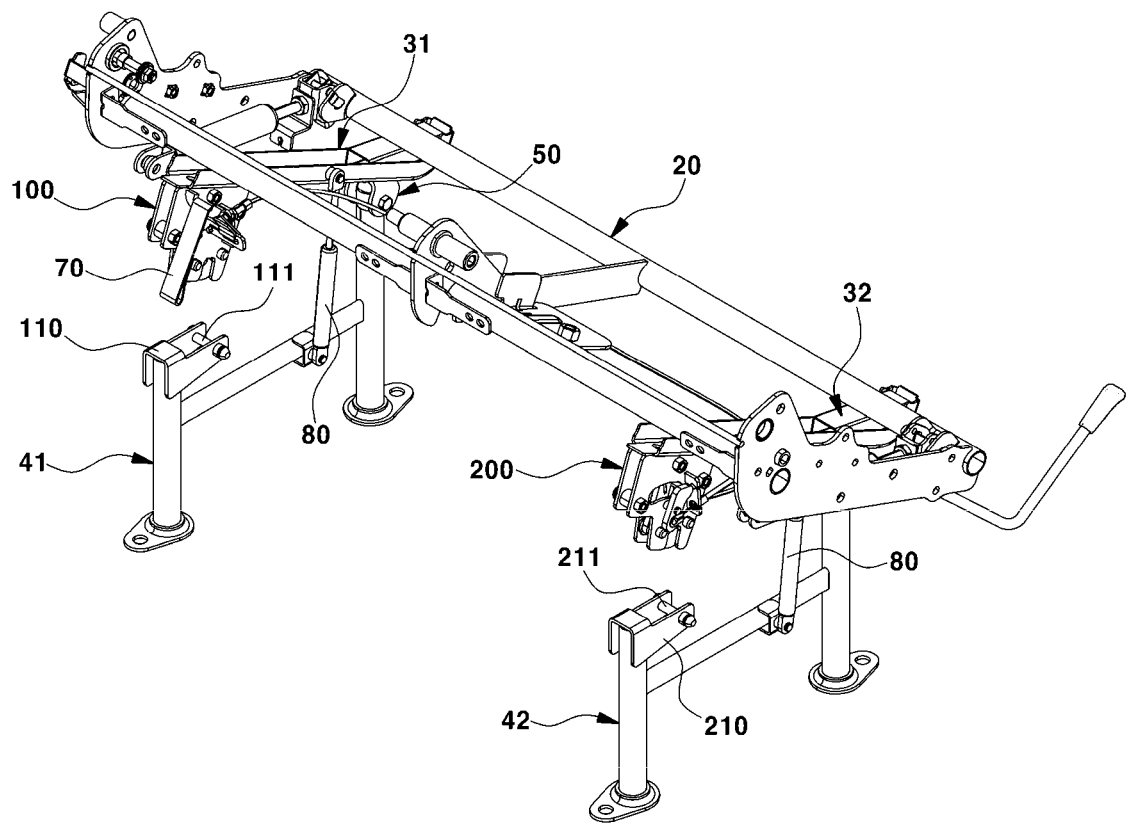

[FIG. 4A]
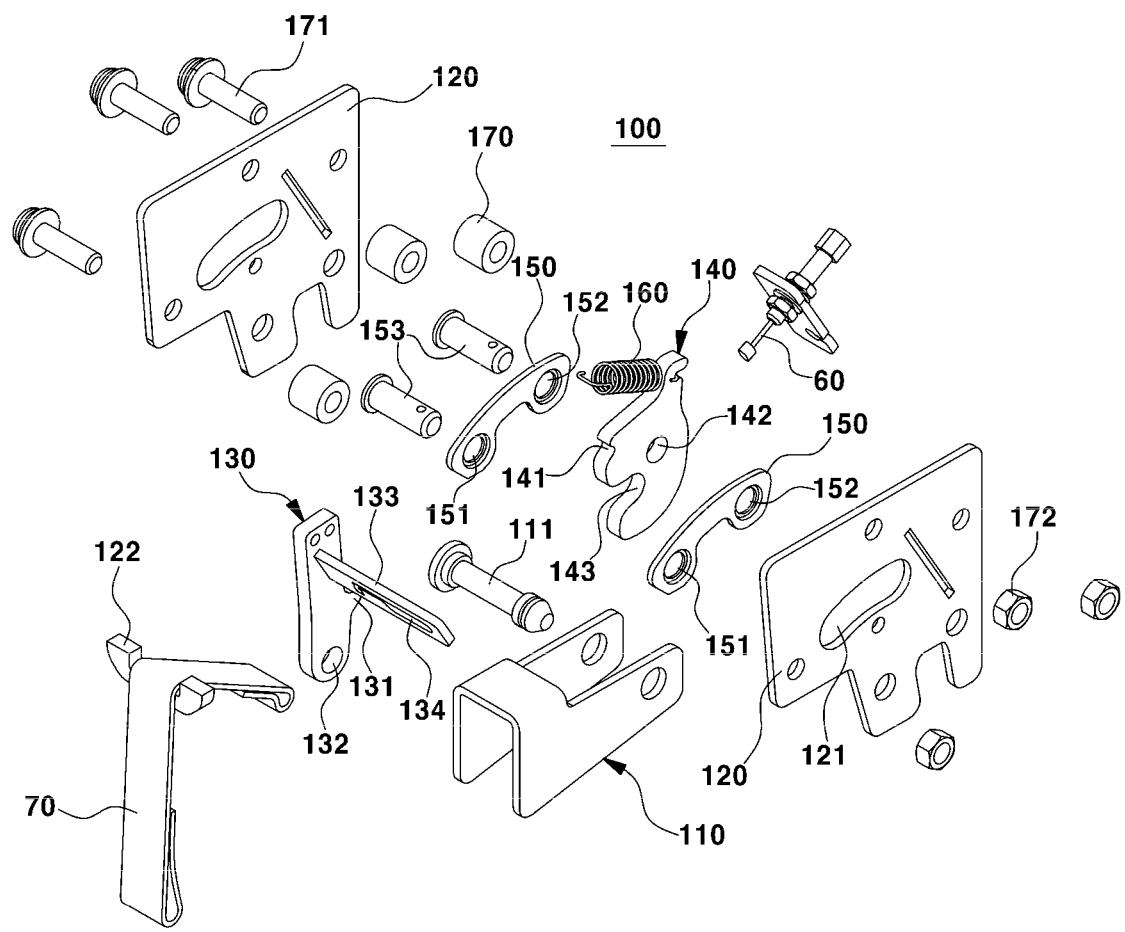

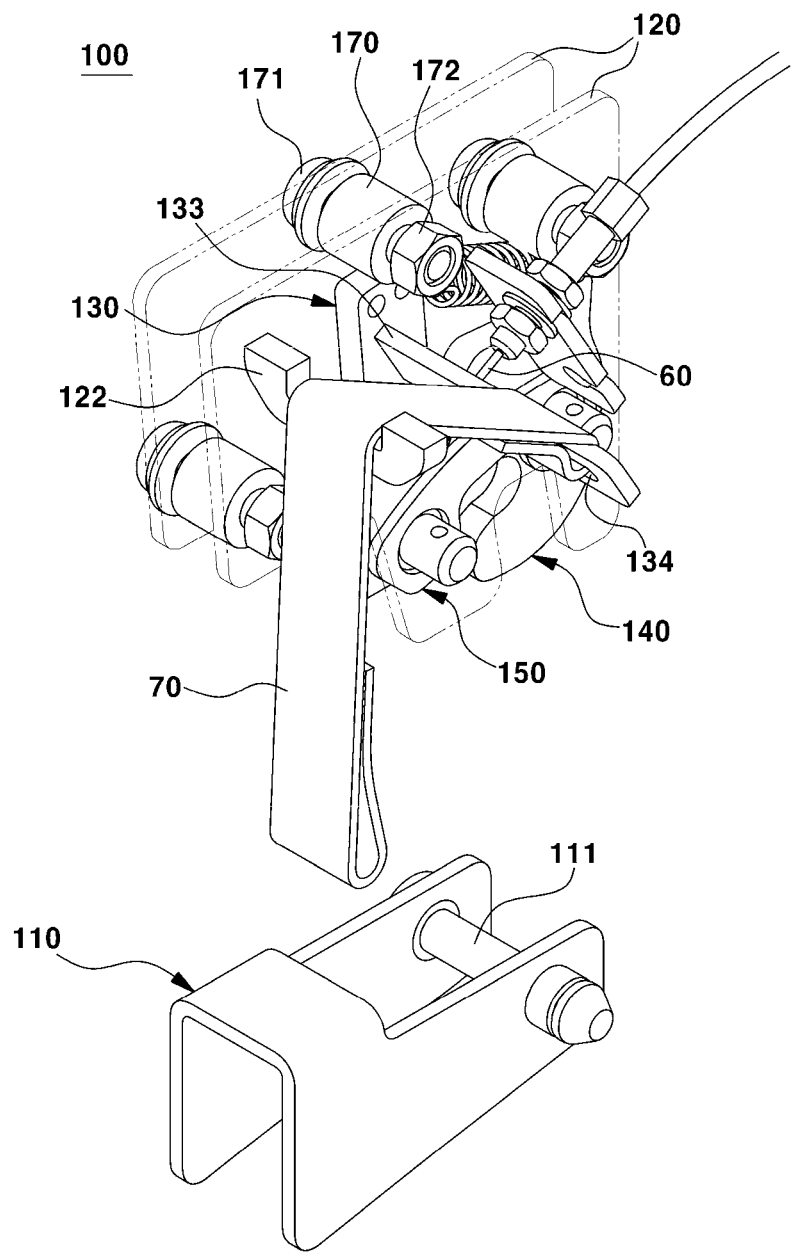
[FIG. 4B]

[FIG. 5A]
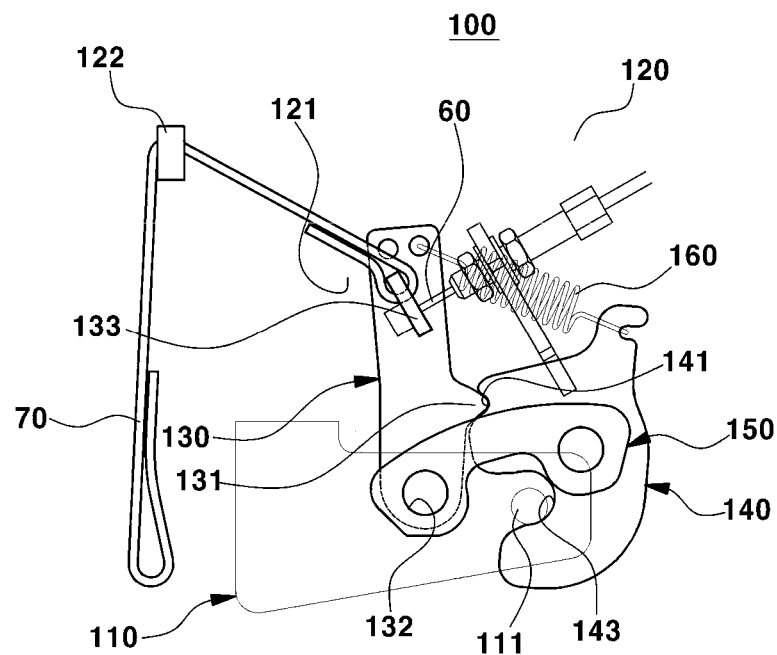
[FIG. 5B]
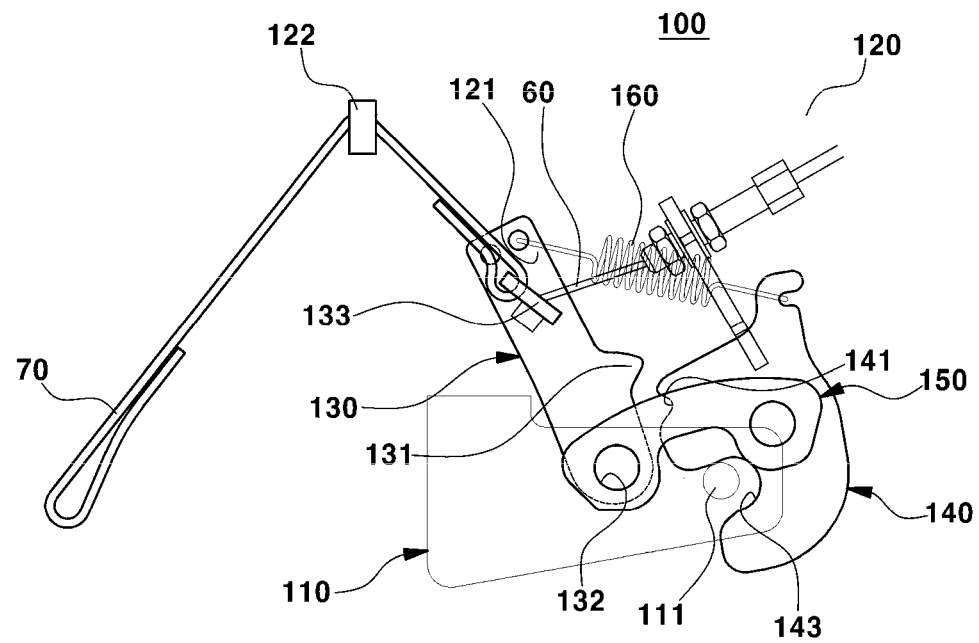

[FIG. 5C]
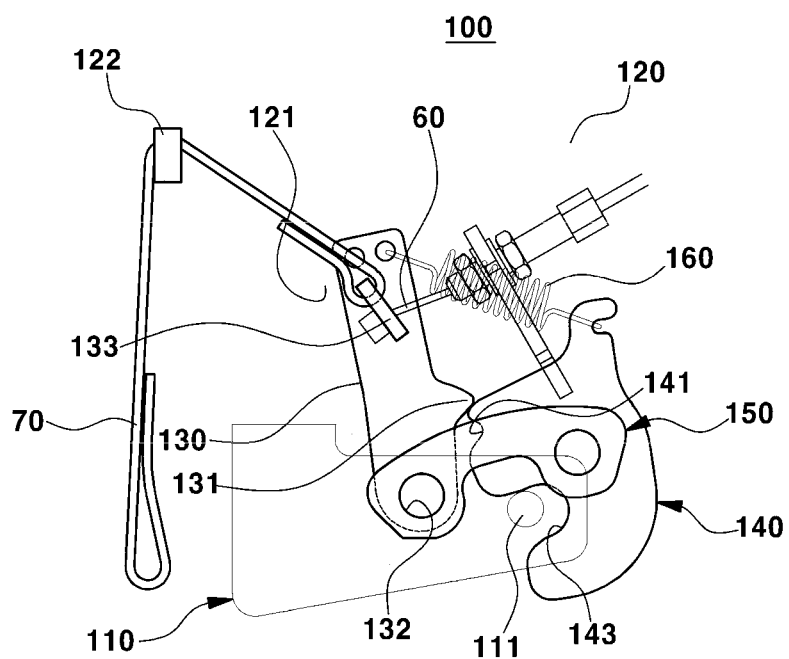

[FIG. 5D]
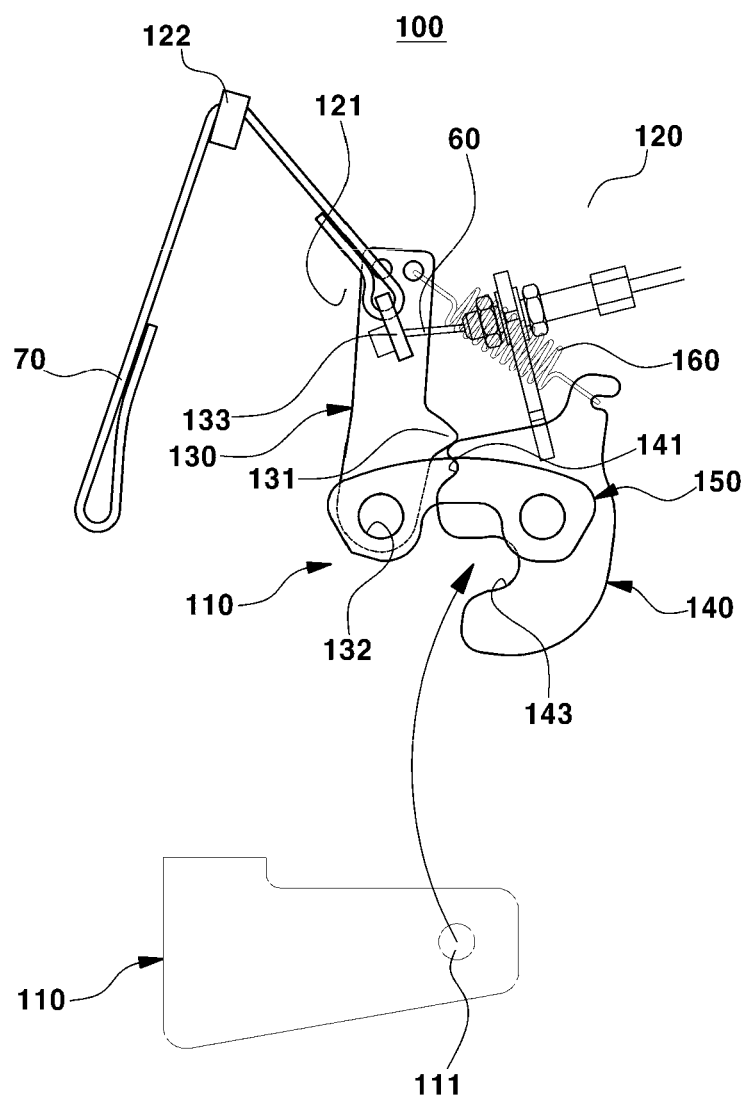

[FIG. 6A]
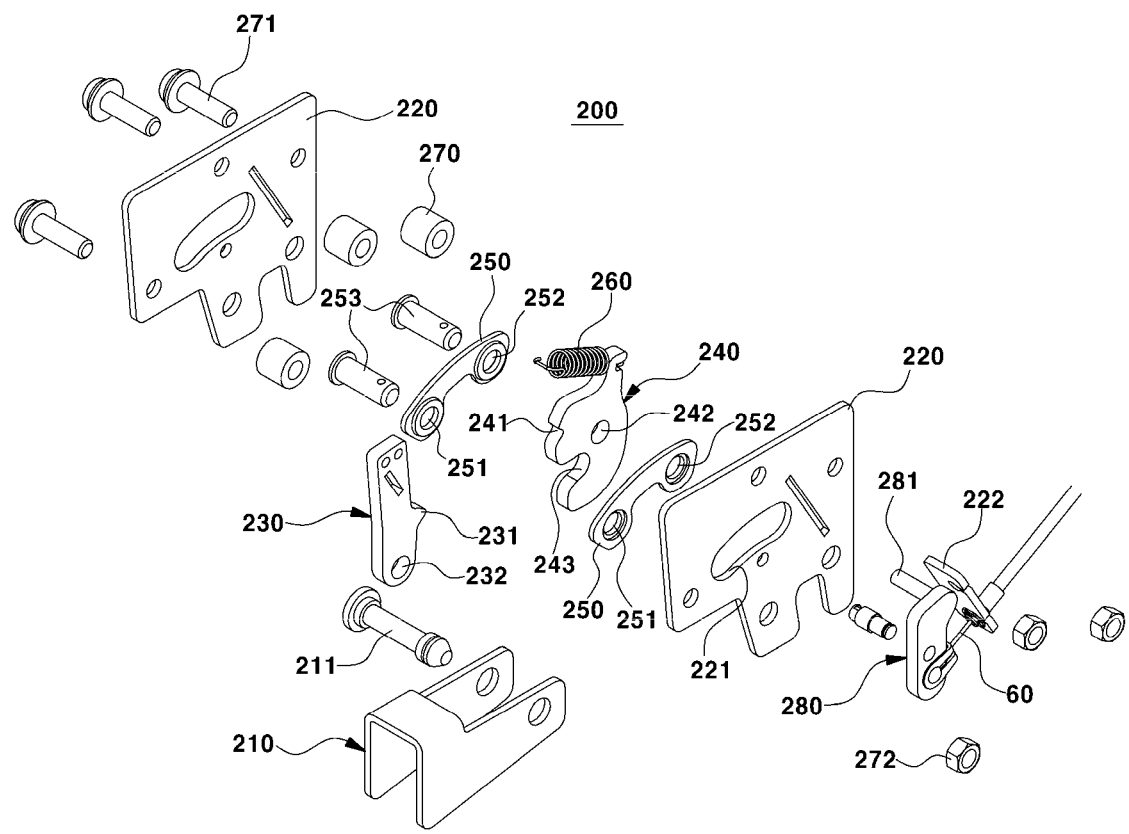

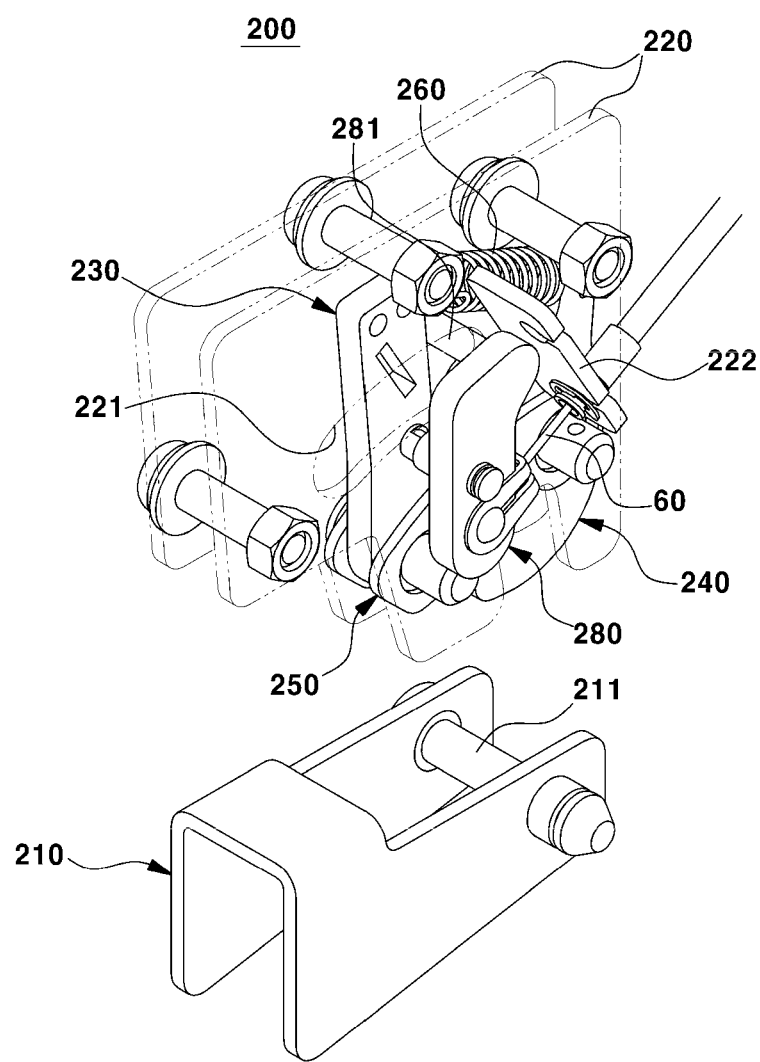
[FIG. 6B]

[FIG. 7A]
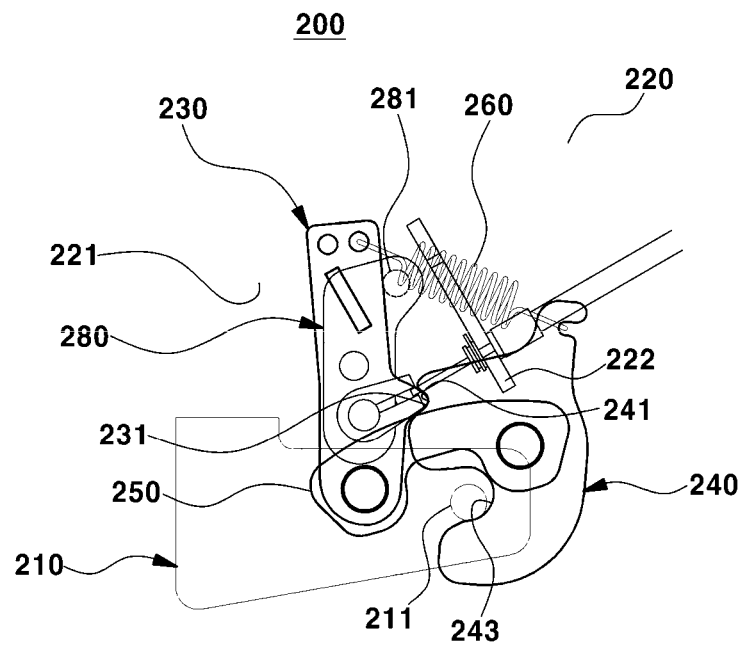
[FIG. 7B]
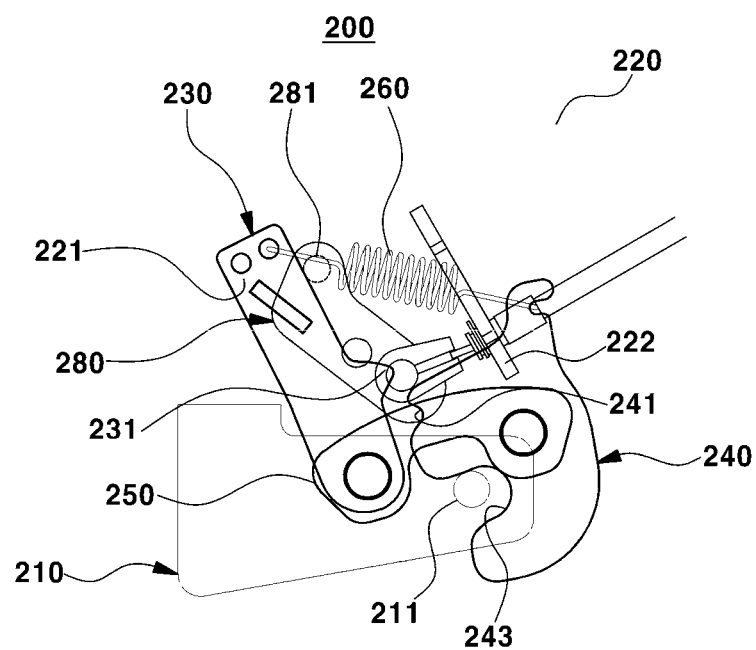

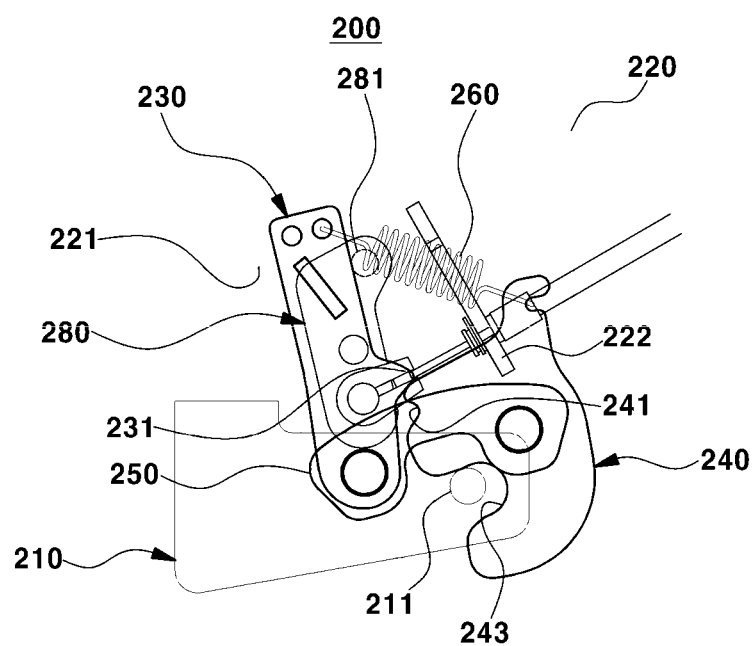
[FIG. 7C]

[FIG. 7D]
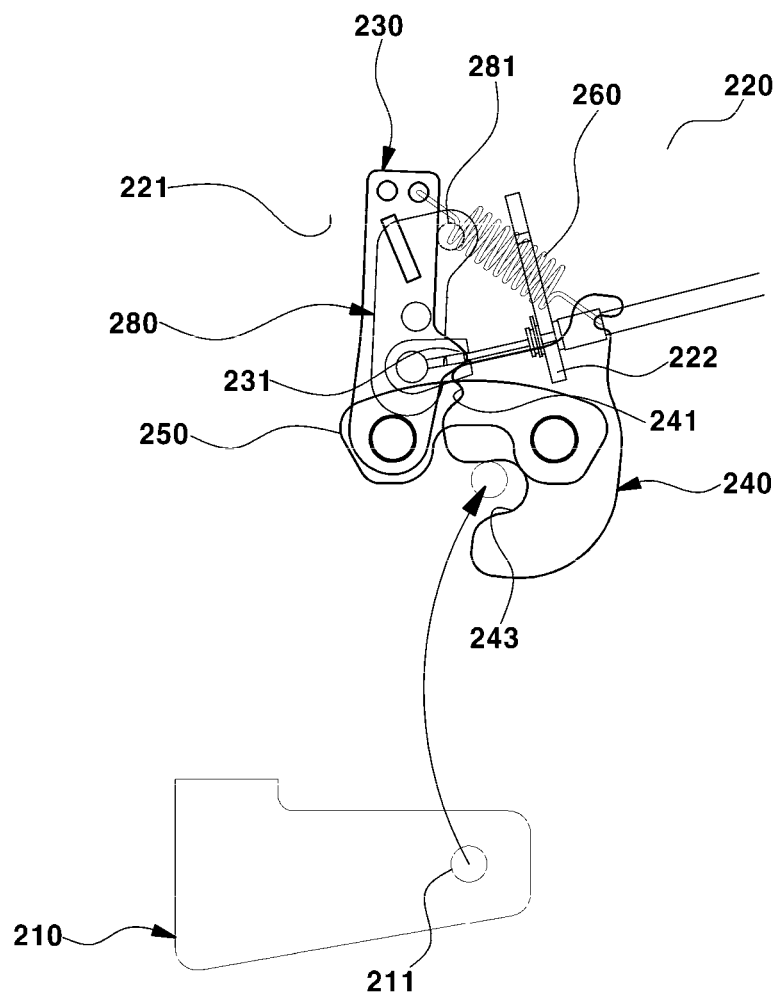

[FIG. 8]
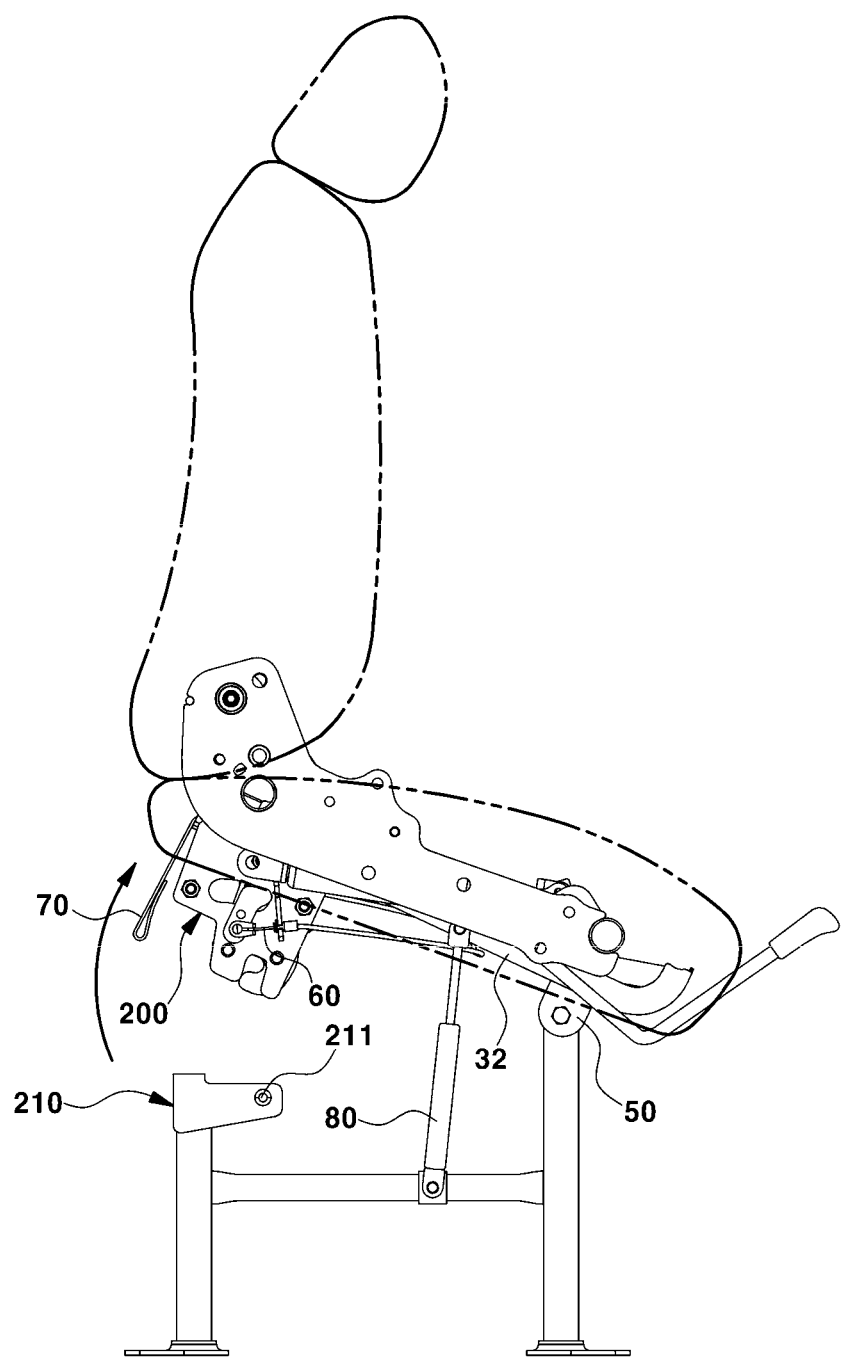

DEVICE FOR FOLDING EMERGENCY EXIT SEAT FOR BUS

CROSS-REFERENCE TO RELATED APPLICATION

This application claims the benefit of priority to Korean Patent Application No. 10-2019-0113226 filed on Sep. 16, 2019 in the Korean Intellectual Property Office, the entire contents of which are incorporated herein by reference.

TECHNICAL FIELD

The present disclosure relates to a device for folding an emergency exit seat for a bus. More particularly, the present disclosure relates to a device for folding an emergency exit seat for a bus, which enables a passenger to easily fold the emergency exit seat located next to the emergency exit of the bus by simply pulling a strap.

BACKGROUND

In general, a bus (particularly, a large-sized bus) is provided with an emergency exit for escape to the outside in an emergency situation in addition to an entrance door for boarding/exiting of passengers.

One of the passenger seats is located next to the emergency exit (hereinafter, referred to as an "emergency exit seat") in a bus. A portion of the emergency exit is generally blocked by the emergency exit seat.

Therefore, the emergency exit seat needs to be foldable in order to secure an escape passage for passengers to the emergency exit in the event of an emergency.

A conventional emergency exit seat has: left and right seat leg frames mounted on the floor panel and connected to each other via a circular bar; seat legs pinned on the seat leg frames; and t a foot pedal for releasing the pinned portions of the seat legs.

In the event of an emergency, a passenger presses the foot pedal to release the pinned portions of the seat legs and pushes the seat forwards, so that the entire seat including the seat legs is rotated and an escape passage to the emergency exit is secured.

However, not only is the entire seat including the seat legs heavy, but the trajectory along which the entire seat including the seat legs is rotated is also large, which makes it difficult for a passenger to rotate the entire seat including the seat legs forwards. In addition, there is a risk of a passenger tripping over the foot pedal or the like during escape.

The information included in this Background section is only for enhancement of understanding of the general background of the present disclosure and may not be taken as an acknowledgement or any form of suggestion that this information forms the prior art already known to a person skilled in the art.

SUMMARY OF THE DISCLOSURE

The present disclosure has been made in an effort to solve the above-described problems associated with the prior art, and it is an object of the present disclosure to provide a device for folding an emergency exit seat for a bus, which enables a passenger, in the event of an emergency, to conveniently fold the emergency exit seat, which is located next to the emergency exit of a bus, forwards merely by performing a simple operation of pulling a strap provided at the emergency exit seat with the hand, and thus to easily secure an escape passage to the emergency exit.

In one aspect, the present disclosure provides a device for folding an emergency exit seat for a bus, including: a main frame for supporting a seat; a first folding frame and a second folding frame mounted to a bottom of one side of the main frame and a bottom of an opposite side of the main frame, respectively; a first seat leg and a second seat leg mounted on a floor panel while being spaced apart from each other in a leftward-and-rightward direction; a hinge body configured in a way that a front end portion of the first folding frame is hinged at a front end portion of the first seat leg and a front end portion of the second folding frame is hinged at a front end portion of the second seat leg; a first latch assembly arranged between a rear end portion of the first folding frame and a rear end portion of the first seat leg; a second latch assembly arranged between a rear end portion of the second folding frame and a rear end portion of the second seat leg, a wire having one end portion connected to the first latch assembly to cause unlocking of the first latch assembly and an opposite end portion connected to the second latch assembly to cause unlocking of the second latch assembly; and a strap connected to the first latch assembly, the strap being configured to be pullable.

When the strap is pulled, the first latch assembly is unlocked, and at the same time, the wire is pulled to unlock the second latch assembly.

The first latch assembly may include a first fixing bracket mounted to the rear end portion of the first seat leg, the first fixing bracket including a locking pin fastened to one end portion thereof, a pair of support plates mounted to the rear end portion of the first folding frame while being spaced apart from each other, a latch rotatably disposed between the support plates, the latch including a latching protrusion formed at a front side thereof and a first connection hole formed in a lower rotation point thereof, the latch being configured to allow one end portion of the wire and the inner end portion of the strap to be connected to the latch so as to pull the latch, a hook rotatably disposed between the support plates, the hook including a latching recess formed in a rear side thereof into which the latching protrusion is inserted, a locking recess formed in a lower portion thereof into which the locking pin is inserted, and a second connection hole formed in a central rotation point thereof, a pair of connection plates mounted to the support plates, the connection plates being configured to connect the first connection hole in the latch and the second connection hole in the hook to each other in a hinged manner, and a spring connecting the upper end portion of the latch to the upper end portion of the hook.

In the first latch assembly, the support plates may be coupled to each other, with a bush interposed therebetween, through engagement of a bolt and a nut, and thereafter the upper end portions of the support plates may be welded to the rear end portion of the first folding frame.

In the first latch assembly, each of the connection plates may be provided in the form of a curved bar, and may include a first coupling hole formed in one end portion thereof to correspond to the first connection hole in the latch and a second coupling hole formed in the opposite end portion thereof to correspond to the second connection hole in the hook.

A connection pin may be inserted through the first connection hole and the first coupling hole and may be secured to the support plates, and another connection pin may be inserted through the second connection hole and the second coupling hole and may be secured to the support plates.

In the first latch assembly, the latch may include a pull bar formed integrally on one side surface thereof, and each of the support plates may include a first slot formed therein to allow the pull bar to pass and protrude outside therethrough and to guide the pull bar to rotate therealong.

The pull bar may include a fitting hole formed therein to allow the one end portion of the wire and the inner end portion of the strap to be fitted thereinto.

In the first latch assembly, a guide bar may be mounted to the rear end portion of one of the support plates, and the strap may be hung on the guide bar so as to be directed backwards.

The second latch assembly may include a second fixing bracket mounted to the rear end portion of the second seat leg, the second fixing bracket including a locking pin fastened to one end portion thereof, a pair of support plates mounted to the rear end portion of the second folding frame while being spaced apart from each other, a latch rotatably disposed between the support plates, the latch including a latching protrusion formed at a front side thereof and a first connection hole formed in a lower rotation point thereof, a hook rotatably disposed between the support plates, the hook including a latching recess formed in a rear side thereof into which the latching protrusion is inserted, a locking recess formed in a lower portion thereof into which the locking pin is inserted, and a second connection hole formed in a central rotation point thereof, a pair of connection plates mounted to the support plates, the connection plates being configured to connect the first connection hole in the latch and the second connection hole in the hook to each other in a hinged manner, a spring connecting the upper end portion of the latch to the upper end portion of the hook, and a wire-interlocking link connected at an upper end portion thereof to one side surface of the upper end portion of the latch, connected at a lower end portion thereof to the opposite end portion of the wire, and hinged at a center portion thereof to an outer side surface of one of the support plates.

In the second latch assembly, the support plates may be coupled to each other, with a bush interposed therebetween, through engagement of a bolt and a nut, and thereafter the upper end portions of the support plates may be welded to the rear end portion of the second folding frame.

In the second latch assembly, each of the connection plates may be provided in the form of a curved bar, and may include a first coupling hole formed in one end portion thereof to correspond to the first connection hole in the latch and a second coupling hole formed in the opposite end portion thereof to correspond to the second connection hole in the hook.

A connection pin may be inserted through the first connection hole and the first coupling hole and may be secured to the support plates, and another connection pin may be inserted through the second connection hole and the second coupling hole and may be secured to the support plates.

In the second latch assembly, the wire-interlocking link may include a connection bar formed on an inner side surface thereof to be connected to one side surface of the upper end portion of the latch, and each of the support plates may include a second slot formed therein to allow the connection bar to pass therethrough and to guide the connection bar to rotate therealong.

In the second latch assembly, a wire-sheath-fixing plate may be mounted to an outer side surface of one of the support plates in order to guide the direction in which the opposite end portion of the wire is pulled.

Damper cylinders may be disposed between the first seat leg and the first folding frame and between the second seat leg and the second folding frame in order to maintain a folded state of the seat.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is an exploded perspective view showing a device for folding an emergency exit seat for a bus according to the present disclosure;

FIG. 2 is an assembled perspective view showing a locked state of the device for folding an emergency exit seat for a bus according to the present disclosure;

FIG. 3 is an assembled perspective view showing a folded state (an unlocked state) of the device for folding an emergency exit seat for a bus according to the present disclosure;

FIGS. 4A and 4B are perspective views showing a first latch assembly of the device for folding an emergency exit seat for a bus according to the present disclosure;

FIGS. 5A to 5D are side cross-sectional views sequentially showing the operation of the first latch assembly of the device for folding an emergency exit seat for a bus according to the present disclosure;

FIGS. 6A and 6B are perspective views showing a second latch assembly of the device for folding an emergency exit seat for a bus according to the present disclosure;

FIGS. 7A to 7D are side cross-sectional views sequentially showing the operation of the second latch assembly of the device for folding an emergency exit seat for a bus according to the present disclosure; and FIG. 8 is a side view showing the state in which a seat is folded using the device for folding an emergency exit seat for a bus according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to the exemplary embodiments of the present disclosure, examples of which are illustrated in the accompanying drawings.

FIGS. 1 to 3 are perspective views showing a device for folding an emergency exit seat for a bus according to the present disclosure. Reference numeral 20 indicates a main frame on which the seat is seated.

The main frame 20 is mounted to the bottom of a seat cushion of the emergency exit seat.

In other words, the main frame 20 is a part onto which the seat cushion of the emergency exit seat is seated and secured.

A first folding frame 31 and a second folding frame 32 for folding the emergency exit seat are mounted to the bottom of one side of the main frame 20 and the bottom of the opposite side thereof, respectively.

For example, the first folding frame 31 and the second folding frame 32 may be provided in the form of a bar extending long in the forward-and-backward direction and may be mounted to the bottom of the main frame 20 through welding or the like.

In addition, a first seat leg 41 and a second seat leg 42 are mounted on the floor panel below the first folding frame 31 and the second folding frame 32.

The first seat leg 41 and the second seat leg 42 are pipe structures having an "H" shape, and the lower end portions thereof are mounted on the floor panel to support the overall load of the emergency exit seat.

In this case, the first folding frame 31 and the second folding frame 32 are mounted on the first seat leg 41 and the second seat leg 42, respectively, so as to be foldable.

To this end, the front end portion of the first folding frame 31 is hinged to the front end portion of the first seat leg 41 via a hinge body 50, and the front end portion of the second folding frame 32 is hinged to the front end portion of the second seat leg 42 via another hinge body 50.

Each hinge body 50 may include a bracket 51, which is welded to the bottom surface of the front end portion of a respective one of the first and second folding frames 31 and 32, and a hinge pin 52, which is inserted into the bracket 51 and the front-upper end portion of a respective one of the first and second seat legs 41 and 42 to realize a hinge motion therebetween in the state in which the front-upper end portion of a respective one of the first and second seat legs 41 and 42 is inserted into the bracket 51.

As shown in FIG. 3, the first folding frame 31 and the second folding frame 32 pivot about the hinge bodies 50 and lift the main frame 20 upwards, so that the emergency exit seat is folded forwards.

In order to lock the first folding frame 31 and the second folding frame 32 in a normal situation and to unlock the same in an emergency situation, a first latch assembly 100 is mounted between the rear end portion of the first folding frame 31 and the rear end portion of the first seat leg 41, and a second latch assembly 200 is mounted between the rear end portion of the second folding frame 32 and the rear end portion of the second seat leg 42.

In addition, a strap 70 is connected to the first latch assembly 100. A passenger may directly pull the strap 70 in order to realize an unlocking operation.

In addition, the first latch assembly 100 and the second latch assembly 200 are connected to each other via a wire 60 so that the second latch assembly 200 is unlocked in response to the unlocking of the first latch assembly 100.

In the event of an emergency, when a passenger pulls the strap 70, the first latch assembly 100 is unlocked, and at the same time the wire 60 is pulled to unlock the second latch assembly 200.

The configuration of the first latch assembly 100 will be described below in detail.

FIGS. 4A and 4B are views showing the first latch assembly of the device for folding an emergency exit seat for a bus according to the present disclosure. Reference numeral 110 indicates a first fixing bracket.

The rear-upper end portion of the first seat leg 41 is inserted into and welded to the rear portion of the first fixing bracket 110. A locking pin 111 is fastened to the front end portion of the first fixing bracket 110 so as to be exposed in the upward-and-downward direction.

A pair of support plates 120 is mounted to the rear end portion of the first folding frame 31 while being spaced apart from each other.

For example, the support plates 120 are metal plates, and are spaced a predetermined interval apart from each other such that the upper end portions thereof are welded to the rear end portion of the first folding frame 31 in an upright state.

The support plates 120 may be coupled to each other, with a bush 170 interposed therebetween, through engagement of a bolt 171 and a nut 172, and thereafter the upper end portions of the support plates 120 are welded to the rear end portion of the first folding frame 31. That is, the support plates 120 are spaced a predetermined interval apart from each other by the bush 170.

In addition, a latch 130 and a hook 140 are rotatably mounted between the support plates 120.

The latch 130 has the shape of a bar that extends long in the upward-and-downward direction. The latch 130 has a latching protrusion 131 formed at the front side thereof and a first connection hole 132 formed in the lower rotation point thereof. The latch 130 is disposed between the support plates 120 so as to be rotatable by means of a connection plate 150.

In this case, one end portion of the wire 60 and the inner end portion of the strap 70 are connected to the latch 130 so as to pull the latch 130.

To this end, the latch 130 has a pull bar 133 formed integrally therewith. The pull bar 133 protrudes from one side surface of the latch 130, and has a fitting hole 134 formed therein to allow one end portion of the wire 60 and the inner end portion of the strap 70 to be fitted thereinto.

In addition, each of the support plates 120 has a first slot 121 formed therein to allow the pull bar 133 formed on one side surface of the latch 130 to pass and protrude to the outside therethrough and to guide the pull bar 133 to rotate therealong.

When a passenger pulls the strap 70 in the state in which one end portion of the wire 60 and the inner end portion of the strap 70 are fitted in the fitting hole 134 in the pull bar 133, the pull bar 133 is pulled and moved along the first slot 121, and at the same time the wire 60 is also pulled.

The hook 140 has a latching recess 141 formed in the rear side thereof to allow the latching protrusion 131 of the latch 130 to be inserted thereinto, a locking recess 143 formed in the lower portion thereof to allow the locking pin 111 of the first fixing bracket 110 to be inserted thereinto, and a second connection hole 142 formed in the central rotation point thereof. The hook 140 is disposed between the support plates 120 so as to be rotatable by means of the connection plate 150.

In this case, the connection plate 150 is provided in a pair. The connection plates 150 laterally arranged in parallel with each other are disposed from the latch 130 at the rear to the hook 140 at the front.

The connection plates 150 serve to support the latch 130 and the hook 140 so that the latch 130 and the hook 140 are rotatable between the support plates 120.

To this end, each of the connection plates 150 is provided in the form of a curved bar, which has a first coupling hole 151 formed in one end portion thereof so as to correspond to the first connection hole 132 in the latch 130 and a second coupling hole 152 formed in the opposite end portion thereof so as to correspond to the second connection hole 142 in the hook 140.

A connection pin 153 is inserted through the first connection hole 132 in the latch 130 and the first coupling hole 151 in each of the connection plates 150 and is secured to the support plates 120. Another connection pin 153 is inserted through the second connection hole 142 in the hook 140 and the second coupling hole 152 in each of the connection plates 150 and is secured to the support plates 120. As a result, the latch 130 and the hook 140 are rotatably disposed between the support plates 120.

In addition, a spring 160 is connected to the upper end portion of the latch 130 and the upper end portion of the hook 140 and is disposed therebetween. Thus, when the latch 130 is pulled and rotated, the hook 140 is also pulled and rotated in the same direction as the latch 130.

In addition, a guide bar 122 is mounted to the rear end portion of one of the support plates 120 of the first latch assembly 100. The strap 70 is hung on the guide bar 122 so that the rear end portion thereof is directed backwards (e.g. to the rear side of the emergency exit seat). As a result, the strap 70 may be disposed at a position at which it can be seen and pulled by a passenger.

The configuration of the second latch assembly 200 will be described below in detail.

FIGS. 6A and 6B are views showing the second latch assembly of the device for folding an emergency exit seat for a bus according to the present disclosure. Reference numeral 210 indicates a second fixing bracket.

The rear-upper end portion of the second seat leg 42 is inserted into and welded to the rear portion of the second fixing bracket 210. A locking pin 211 is fastened to the front end portion of the second fixing bracket 210 so as to be exposed in the upward-and-downward direction.

A pair of support plates 220 is mounted to the rear end portion of the second folding frame 32 while being spaced apart from each other.

The support plates 220 may be coupled to each other, with a bush 170 interposed therebetween, through engagement of a bolt 171 and a nut 172, and thereafter the upper end portions of the support plates 120 are welded to the rear end portion of the second folding frame 32. That is, the support plates 220 are spaced a predetermined interval apart from each other by the bush 170.

In addition, a latch 230 and a hook 240 are rotatably mounted between the support plates 220.

The latch 230 has the shape of a bar that extends long in the upward-and-downward direction. The latch 230 has a latching protrusion 231 formed at the front side thereof and a first connection hole 232 formed in the lower rotation point thereof. The latch 230 is disposed between the support plates 220 so as to be rotatable by means of a connection plate 250.

The hook 240 has a latching recess 241 formed in the rear side thereof to allow the latching protrusion 231 of the latch 230 to be inserted thereinto, a locking recess 243 formed in the lower portion thereof to allow the locking pin 211 of the second fixing bracket 210 to be inserted thereinto, and a second connection hole 242 formed in the central rotation point thereof. The hook 240 is disposed between the support plates 220 so as to be rotatable by means of the connection plate 250.

In this case, the connection plate 250 is provided in a pair. The connection plates 250 laterally arranged in parallel with each other are disposed from the latch 230 at the rear to the hook 240 at the front.

The connection plates 250 serve to support the latch 230 and the hook 240 so that the latch 230 and the hook 240 are rotatable between the support plates 220.

To this end, each of the connection plates 250 is provided in the form of a curved bar, which has a first coupling hole 251 formed in one end portion thereof so as to correspond to the first connection hole 232 in the latch 230 and a second coupling hole 252 formed in the opposite end portion thereof so as to correspond to the second connection hole 242 in the hook 240.

A connection pin 253 is inserted through the first connection hole 232 in the latch 230 and the first coupling hole 251 in each of the connection plates 250 and is secured to the support plates 220. Another connection pin 253 is inserted through the second connection hole 242 in the hook 240 and the second coupling hole 252 in each of the connection plates 250 and is secured to the support plates 220. As a result, the latch 230 and the hook 240 are rotatably disposed between the support plates 220.

In addition, a spring 260 is connected to the upper end portion of the latch 230 and the upper end portion of the hook 240 and is disposed therebetween. Thus, when the latch 230 is pulled and rotated, the hook 240 is also pulled and rotated in the same direction as the latch 230.

A wire-interlocking link 280 is hinged to the outer side surface of one of the support plates 220 of the second latch assembly 200.

Specifically, the center portion of the wire-interlocking link 280 is hinged to the outer side surface of one of the support plates 220, the upper end portion thereof is connected to one side surface of the upper end portion of the latch 230 via a connection bar 281, and the lower end portion thereof is connected to the opposite end portion of the wire 60.

In this case, the inner side surface of the upper end portion of the wire-interlocking link 280 is connected to one side surface of the upper end portion of the latch 230 via the connection bar 281. Each of the support plates 220 has a second slot 221 formed therein to allow the connection bar 281 to pass therethrough and to guide the connection bar 281 to rotate therealong.

A wire-sheath-fixing plate 222 may be mounted to the outer side surface of one of the support plates 220 of the second latch assembly 200. The wire-sheath-fixing plate 222 serves to guide the direction in which the opposite end portion of the wire 60 is pulled.

In addition, a damper cylinder 80 connects the first seat leg 41 to the first folding frame 31, and another damper cylinder 80 connects the second seat leg 42 to the second folding frame 32. The damper cylinders 80 serve to maintain the folded state of the emergency exit seat after it has been folded.

Hereinafter, the operation of the device for folding an emergency exit seat for a bus according to the present disclosure configured as described above will be described.

FIGS. 5A to 5D are side cross-sectional views sequentially showing the operation of the first latch assembly according to the present disclosure, FIGS. 7A to 7D are side cross-sectional views sequentially showing the operation of the second latch assembly according to the present disclosure, and FIG. 8 is a side view showing the state in which a seat is folded using the device for folding an emergency exit seat for a bus according to the present disclosure.

As shown in FIG. 5A, in a normal situation, the first latch assembly 100 has the following operational state: the latching protrusion 131 of the latch 130 is maintained in a locked state by being inserted into the latching recess 141 in the hook 140, and the locking pin 111 of the first fixing bracket 110 is maintained in a locked state by being inserted into the locking recess 143 in the hook 140.

In the event of an emergency such as an accident or a fire in a bus, passengers in the bus need to escape to the outside through the emergency exit for emergency escape as well as through the entrance door for boarding/exiting.

When a passenger pulls the strap 70, as shown in FIG. 5B, the pull bar 133 of the latch 130 connected to the strap 70 is pulled backwards, and the latch 130 is rotated backwards about the lower rotation point thereof.

At the same time, the hook 140, connected to the latch 130 via the spring 160, is also pulled and rotated about the central rotation point thereof in the same direction as the latch 130.

Subsequently, as shown in FIG. 5C, the latching protrusion 131 of the latch 130 escapes from the latching recess 141 in the hook 140 and is hung on the top surface of the hook 140. That is, the latching protrusion 131 is unlocked. In addition, the open side of the locking recess 143 in the hook 140 is directed downwards, and thus the locking pin 111 of the first fixing bracket 110 is unlocked therefrom.

Accordingly, as shown in FIG. 5D, the support plates 120 welded to the rear end portion of the first folding frame 31 become separable from the first fixing bracket 110 welded to the rear-upper end portion of the first seat leg 41.

At this time, unlocking of the second latch assembly 200 is performed simultaneously with the unlocking of the first latch assembly 100 described above.

As shown in FIG. 7A, in a normal situation, the second latch assembly 200 has the following operational state: the latching protrusion 231 of the latch 230 is maintained in a locked state by being inserted into the latching recess 241 in the hook 240, and the locking pin 211 of the second fixing bracket 210 is maintained in a locked state by being inserted into the locking recess 243 in the hook 240.

In this state, when a passenger pulls the strap 70, the latch 130 of the first latch assembly 100 is rotated backwards about the lower rotation point thereof, and one end portion of the wire 60 is pulled.

As the same time, the opposite end portion of the wire 60 is also pulled out. As shown in FIG. 7B, the lower end portion of the wire-interlocking link 280 of the second latch assembly 200, which is connected to the opposite end portion of the wire 60, is pulled, and thus the wire-interlocking link 280 is rotated backwards about the central rotation point thereof.

At this time, since the latch 230 and the wire-interlocking link 280, which are the components of the second latch assembly 200, are connected to each other via the connection bar 281, the latch 230 is also rotated in the same direction as the wire-interlocking link 280.

Subsequently, as shown in FIG. 7C, the latching protrusion 231 of the latch 230 escapes from the latching recess 241 in the hook 240 and is hung on the top surface of the hook 240. That is, the latching protrusion 231 is unlocked. In addition, the open side of the locking recess 243 in the hook 240 is directed downwards, and thus the locking pin 211 of the second fixing bracket 210 is unlocked therefrom.

Accordingly, as shown in FIG. 7D, the support plates 220 welded to the rear end portion of the second folding frame 32 become separable from the second fixing bracket 210 welded to the rear-upper end portion of the second seat leg 42.

After the operation of unlocking the first latch assembly 100 and the second latch assembly 200 is performed, when a passenger pushes the emergency exit seat 10 forwards, as shown in FIG. 8, the emergency exit seat 10 is folded forwards, thereby easily securing the escape passage to the emergency exit, which has been blocked by the emergency exit seat 10.

In this case, the first seat leg 41 and the second seat leg 42 remain mounted on the floor panel, and the first folding frame 31 and the second folding frame 32 are folded together with the emergency exit seat 10 including the main frame.

As such, unlike a conventional seat-folding device, since the seat legs remain mounted on the floor panel when the emergency exit seat is folded, the trajectory along which the seat is rotated when folded forwards is reduced, and a passenger is capable of easily folding the seat forwards.

In addition, when the emergency exit seat 10 is folded forwards, the damper cylinders 80, which are disposed between the first seat leg 41 and the first folding frame 31 and between the second seat leg 42 and the second folding frame 32, are extended. The extended damper cylinders 80 securely maintain the folded state of the emergency exit seat 10 by preventing the emergency exit seat 10 from being restored to the unfolded state, thereby allowing passengers to safely escape through the emergency exit.

As is apparent from the above description, the device according to the present disclosure has the following effects.

First, in the event of an emergency in which passengers in a bus need to escape therefrom, a passenger may conveniently fold the emergency exit seat forwards merely by performing a simple operation of pulling a strap provided at the emergency exit seat with the hand, and thus may easily secure an escape passage to the emergency exit.

Second, unlike a conventional seat-folding device, since seat legs remain mounted on the floor panel when the emergency exit seat is folded, the trajectory along which the seat is rotated when folded forwards may be reduced, and a passenger may easily fold the seat forwards.

Third, since a foot pedal used in a conventional seat-folding device is eliminated from the floor panel, the aesthetic appearance of the device according to the present disclosure may be improved, and the risk of a passenger tripping over the foot pedal during escape may be prevented.

The disclosure has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:
1. A device for folding an emergency exit seat for a bus, the device comprising:
   a main frame for supporting a seat;
   a first folding frame and a second folding frame configured to be mounted to a bottom of one side of the main frame and a bottom of an opposite side of the main frame, respectively;

a first seat leg and a second seat leg configured to be mounted on a floor panel while being spaced apart from each other in a leftward-and-rightward direction;

a hinge body configured in a way that a front end portion of the first folding frame is hinged at a front end portion of the first seat leg and a front end portion of the second folding frame is hinged at a front end portion of the second seat leg;

a first latch assembly arranged between a rear end portion of the first folding frame and a rear end portion of the first seat leg;

a second latch assembly arranged between a rear end portion of the second folding frame and a rear end portion of the second seat leg;

a wire having one end portion connected to the first latch assembly to cause unlocking of the first latch assembly and an opposite end portion connected to the second latch assembly to cause unlocking of the second latch assembly; and a strap connected to the first latch assembly, the strap being configured to be pullable.

2. The device of claim 1, wherein the first latch assembly comprises:

a first fixing bracket mounted to the rear end portion of the first seat leg, the first fixing bracket comprising a locking pin fastened to one end portion thereof;

a pair of support plates mounted to the rear end portion of the first folding frame while being spaced apart from each other;

a latch rotatably disposed between the pair of support plates, the latch comprising a latching protrusion extending from a front side thereof and a first connection hole formed in a lower rotation point thereof, the latch being configured in a way that one end portion of the wire and an inner end portion of the strap are connected to the latch so as to pull the latch;

a hook rotatably disposed between the pair of support plates, the hook comprising:
 a latching recess in a rear side thereof into which the latching protrusion is inserted,
 a locking recess in a lower portion thereof into which the locking pin is inserted, and
 a second connection hole in a central rotation point thereof;

a pair of connection plates mounted to the pair of support plates, the pair of connection plates being configured to connect the first connection hole in the latch and the second connection hole in the hook to each other in a hinged manner; and a spring connecting an upper end portion of the latch to an upper end portion of the hook.

3. The device of claim 2, wherein the pair of support plates are coupled to each other, with a bush interposed therebetween, through engagement of a bolt and a nut, and wherein upper end portions of the pair of support plates are welded to the rear end portion of the first folding frame.

4. The device of claim 2, wherein each of the connection plates has a curved bar shape, and comprises:

a first coupling hole defined in one end portion thereof to correspond to the first connection hole in the latch; and a second coupling hole defined in an opposite end portion thereof to correspond to the second connection hole in the hook.

5. The device of claim 4, wherein a first connection pin extends through the first connection hole and the first coupling hole and is secured to the pair of support plates, and wherein a second connection pin extends through the second connection hole and the second coupling hole and is secured to the pair of support plates.

6. The device of claim 2, wherein the latch comprises a pull bar protruding integrally on one side surface thereof, and wherein each of the pair of support plates comprises a first slot therein such that the pull bar passes and protrudes outside through the first slot, the first slot guiding the pull bar to rotate therealong.

7. The device of claim 6, wherein the pull bar comprises a fitting hole defined therein such that the one end portion of the wire and the inner end portion of the strap are fitted into the fitting hole.

8. The device of claim 2, further comprising a guide bar mounted to a rear end portion of one of the pair of support plates, wherein the strap is configured to be hung on the guide bar and directed backwards.

9. The device of claim 1, wherein the second latch assembly comprises:

a second fixing bracket mounted to the rear end portion of the second seat leg, the second fixing bracket comprising a locking pin fastened to one end portion of the second fixing bracket;

a pair of support plates mounted to the rear end portion of the second folding frame while being spaced apart from each other;

a latch rotatably arranged between the pair of support plates, the latch comprising a latching protrusion extending from a front side thereof and a first connection hole defined in a lower rotation point thereof;

a hook rotatably disposed between the pair of support plates, the hook comprising:
 a latching recess in a rear side thereof into which the latching protrusion is inserted,
 a locking recess in a lower portion thereof into which the locking pin is inserted, and
 a second connection hole defined in a central rotation point thereof;

a pair of connection plates mounted to the pair of support plates, respectively, the pair of connection plates being configured to connect the first connection hole in the latch and the second connection hole in the hook to each other in a hinged manner;

a spring connecting an upper end portion of the latch to an upper end portion of the hook; and a wire-interlocking link having an upper end portion connected to one side surface of the upper end portion of the latch, a lower end portion connected to an opposite end portion of the wire, and a center portion hinged at an outer side surface of one of the pair of support plates.

10. The device of claim 9, wherein the pair of support plates are coupled to each other, with a bush interposed therebetween, through engagement of a bolt and a nut, and wherein upper end portions of the pair of support plates are welded to the rear end portion of the second folding frame.

11. The device of claim 9, wherein each of the pair of connection plates has a curved bar shape, and comprises:

a first coupling hole defined in one end portion thereof to correspond to the first connection hole in the latch; and a second coupling hole defined in an opposite end portion thereof to correspond to the second connection hole in the hook.

12. The device of claim 11, wherein a connection pin extends through the first connection hole and the first coupling hole and is secured to the pair of support plates, and
wherein another connection pin is inserted through the second connection hole and the second coupling hole and is secured to the pair of support plates.

13. The device of claim 9, wherein the wire-interlocking link comprises a connection bar protruding on an inner side surface thereof and connected to one side surface of the upper end portion of the latch, and
wherein each of pair of the support plates comprises a second slot therein such that the connection bar passes therethrough and the connection bar rotates along the second slot.

14. The device of claim 9, further comprising a wire-sheath-fixing plate mounted to an outer side surface of one of the pair of support plates,
wherein the wire-sheath-fixing plate is configured to guide a direction in which the opposite end portion of the wire is pulled.

15. The device of claim 1, further comprising damper cylinders arranged between the first seat leg and the first folding frame and between the second seat leg and the second folding frame,
wherein the damper cylinders being configured to maintain a folded state of the seat.

* * * * *